(12) United States Patent
Wilhelm et al.

(10) Patent No.: US 11,692,961 B2
(45) Date of Patent: Jul. 4, 2023

(54) SENSOR ELEMENT FOR A POTENTIOMETRIC SENSOR AND RESPECTIVE MANUFACTURING METHOD

(71) Applicant: Endress+Hauser Conducta GmbH+Co. KG, Gerlingen (DE)

(72) Inventors: Thomas Wilhelm, Chemnitz (DE); Matthäus Speck, Göpfersdorf (DE); Michael Hanko, Dresden (DE)

(73) Assignee: Endress+Hauser Conducta GmbH+Co. KG, Gerlingen (DE)

( * ) Notice: Subject to any disclaimer, the term of this patent is extended or adjusted under 35 U.S.C. 154(b) by 354 days.

(21) Appl. No.: 16/996,468

(22) Filed: Aug. 18, 2020

(65) Prior Publication Data

US 2021/0055252 A1 Feb. 25, 2021

(30) Foreign Application Priority Data

Aug. 21, 2019 (DE) ...................... 10 2019 122 519.1
Aug. 21, 2019 (DE) ...................... 10 2019 122 520.5
Dec. 6, 2019 (DE) ...................... 10 2019 133 455.1
Dec. 6, 2019 (DE) ...................... 10 2019 133 458.6

(51) Int. Cl.

| G01N 27/333 | (2006.01) |
|---|---|
| G01N 27/30 | (2006.01) |
| C03C 27/02 | (2006.01) |
| C23D 5/00 | (2006.01) |
| C03C 4/18 | (2006.01) |
| G01N 27/36 | (2006.01) |

(52) U.S. Cl.
CPC ............ *G01N 27/333* (2013.01); *C03C 4/18* (2013.01); *C03C 27/02* (2013.01); *C23D 5/005* (2013.01); *G01N 27/301* (2013.01); *G01N 27/36* (2013.01)

(58) Field of Classification Search
CPC ......... G01N 27/333; G01N 27/36; C03C 4/18
See application file for complete search history.

(56) References Cited

U.S. PATENT DOCUMENTS 3,458,422 A 7/1969 Proctor, Jr.
3,498,901 A 3/1970 Metz et al.

FOREIGN PATENT DOCUMENTS

CN 109752435 A 5/2019
CN 109906374 A 6/2019
(Continued)

OTHER PUBLICATIONS

Rainer Trampert, "Email-Keramik-pH-Sensor im Stahlverbund," Technisches Messen 77 (2010) 3 pp. 173-178 (Year: 2010).*
(Continued)

*Primary Examiner* — Alexander S Noguerola
(74) *Attorney, Agent, or Firm* — Christopher R. Powers; Endress+Hauser (USA) Holding, Inc.

(57) ABSTRACT

The present disclosure relates to a sensor element for a potentiometric sensor, comprising a substrate formed from a metal alloy and an ion-selective enamel layer arranged on the substrate, wherein the metal alloy comprises at least one transition metal and wherein the ion-selective enamel layer contains a proportion of an oxide of the transition metal, and wherein an electrically conductive transition zone is arranged between the substrate and the enamel layer and contains the transition metal in a plurality of different oxidation states.

18 Claims, 2 Drawing Sheets

(56) References Cited

FOREIGN PATENT DOCUMENTS

| DE | 102013101420 A1 | | 8/2014 | | |
|----|----|---|---|---|---|
| EP | 1231189 A1 | | 8/2002 | | |
| WO | WO 2010073875 A1 | * | 7/2010 | ............... | C03C 4/18 |
| WO | 2017137346 A1 | | 8/2017 | | |
| WO | WO 2017137346 A1 | * | 8/2017 | ............ | G01N 27/36 |
| WO | 2018069491 A1 | | 4/2018 | | |

OTHER PUBLICATIONS

Google English language machine translation (Oct. 17, 2022) of Rainer Trampert, "Email-Keramik-pH-Sensor im Stahlverbund," Technisches Messen 77 (2010) 3 pp. 173-178 (Year: 2010).*

"About steel" on the WorldSteel Association website https://worldsteel.org/about-steel/about-steel/ Downloaded Oct. 17, 2022 (Year: 2022).*

Bodaghi et al., "The influence of cobalt on the microstructure and adherence characteristics of enamel on steel sheet," Processing and Application of Ceramics 5[4] (2011) 215-222 (Year: 2010).*

An EPO machine-generated English language translation Günter Taubner WO 2017/137346 A1, downloaded Oct. 17, 2022, patent published Aug. 17, 2017 (Year: 2017).*

Peter Kurzweil, Review—"metal Oxides and Ion-Exchanging Surfaces as pH Sensors in Liquids: State-of-the-Art and Outlook," Sensors 2009, 9, 4955-4985 (Year: 2009).*

An EPO machine-generated English language translation Hashimoto et al. WO 2010/073875 A1, downloaded Oct. 17, 2022, patent published Jan. 1, 2010 (Year: 2010).*

Excerpt from "transition metal" entry in the on-line Encyclopedia Britannica (Year: 2022).*

Niedriglegierte Kupferwerkstoffe, Deutches Kupferinstitut Berufsverband e.V., Copper Alliance, 36 pp.

* cited by examiner

SENSOR ELEMENT FOR A POTENTIOMETRIC SENSOR AND RESPECTIVE MANUFACTURING METHOD

CROSS-REFERENCE TO RELATED APPLICATION

The present application is related to and claims the priority benefit of German Patent Application No. 10 2019 122 519.1, filed Aug. 21, 2019, 10 2019 122 520.5, filed Aug. 21, 2019, 10 2019 133 455.1, filed Dec. 6, 2019, and 10 2019 133 458.6, filed Dec. 6, 2019, the entire contents of which are incorporated herein by reference.

TECHNICAL FIELD

The present disclosure relates to a sensor element for a potentiometric sensor, to a potentiometric sensor, and to a method for manufacturing a sensor element for a potentiometric sensor.

BACKGROUND

Potentiometric sensors are used in laboratory and process measurement technology in many areas of chemistry, biochemistry, pharmacy, biotechnology, food technology, water management, and environmental measurement technology for the analysis of measuring media, especially, measuring liquids. Potentiometric sensors allow detection of activities of chemical substances, such as ion activities, and correlated measured variables in liquids. The substance, the activity or concentration of which is to be measured is also referred to as an analyte. The measuring medium can be a measuring liquid, such as an aqueous solution, emulsion, or suspension.

Potentiometric sensors generally comprise a measuring electrode and a reference electrode as well as a sensor circuit for detecting measured values and for signal processing. The measuring and reference electrodes can be combined in a measuring probe which can be immersed in the measuring liquid. This measuring probe may also comprise the sensor circuit or at least part of the sensor circuit. The measuring probe can be connected for communication to a higher-level unit, for example, a measuring transducer, an electronic operating device, a computer, or a controller, via a cable or wirelessly. The higher-level unit can be used for further processing the measurement signals or measured values detected by means of the measuring probe and for operating the measuring probe.

In contact with the measuring medium, the measuring electrode forms a potential that is a function of the activity of the analyte in the measuring medium, whereas the reference electrode provides a stable reference potential independent of the analyte concentration. The sensor circuit generates an analog or digital measurement signal which represents the electric voltage (potential difference) between the measuring electrode and the reference electrode and, consequently, the activity of the analyte in the measuring medium. The measurement signal may be output from the sensor circuit to the higher-level unit, which further processes the measurement signal. A partial or complete further processing of the measurement signal in the sensor circuit in the measuring probe is also possible.

The reference electrode of conventional potentiometric sensors is often designed as a second-type electrode, e.g., as a silver/silver chloride reference electrode, and is electrically conductively connected to the sensor circuit. It may comprise a housing and a reference element, e.g., a silver wire coated with silver chloride, which is arranged in the housing and which is in electrolytically conductive and/or ion-conducting contact with the measuring liquid in measuring operation via a reference electrolyte contained in the housing and an electrochemical bridge, e.g., a diaphragm.

The measuring electrode comprises a potential-forming sensor element which comprises an ion-selective membrane, depending upon the type of the potentiometric sensor. Examples of such measuring electrodes are ion-selective electrodes (ISE). A traditional ion-selective electrode has a housing that is closed by the ion-selective membrane and accommodates an inner electrolyte that is in contact with the membrane. The ion-selective electrode also comprises a terminal lead which is in contact with the inner electrolyte. The terminal lead is electrically conductively connected to the sensor circuit. If the ion-selective membrane for measuring is in contact with the measuring medium, the membrane selectively interacts with a specific ionic species contained in the measuring medium, namely with the analyte. Changing the activity or concentration of the ion in the measuring medium causes a relative change in the equilibrium galvanic voltage between the measuring medium and the terminal lead in contact with the ion-selective membrane via the inner electrolyte. A special case of such an ion-selective electrode, i.e., an electrode that selectively detects the hydronium ion activity in a measuring liquid, is the known pH glass electrode, which comprises a glass membrane as the potential-forming sensor element. The terms "ion-selective layer," "membrane," or "electrode" used here and hereinafter refer to an ion-sensitive layer, membrane, or electrode, the potential of which is preferably predominantly influenced by the analyte, e.g., a specific ion type or the pH value, wherein cross-sensitivities of the layer, membrane, or electrode for other types of ions are not excluded but are preferably low. The term "ion-selective glass" refers to a glass which is suitable for forming such an ion-selective layer, membrane, or electrode.

It has long been attempted to improve the design of measuring electrodes of potentiometric sensors with the goal of saving costs, simplifying manufacture, and greater robustness and longer service life. One approach that has been picked up again and again is the use of a solid terminal lead, which does not require an inner electrolyte contacting the ion-selective membrane.

An ion-selective electrode with a solid terminal lead (also referred to as fixed contact electrode) is described in WO 2018/069491 A1. This electrode comprises a measuring element with an ion-selective layer which, during operation, is in contact with a measuring medium and is conductive for lithium ions. Furthermore, the measuring element has an electrically conductive layer which comprises metallic lithium, a lithium (0) alloy, or an electrically conductive lithium compound. The measuring element also comprises a solid electrolyte layer, which is arranged between the ion-selective layer and the electrically conductive layer. The measuring element comprises a series of further layers which serve to protect the lithium-containing conductive layer from oxygen or moisture and to contact the ion-selective layer. The manufacture of the sensor element therefore requires a series of individual steps for constructing the layer stack and is correspondingly complex.

Some other approaches for providing electrodes with a solid terminal lead are described in the textbook H. Galster, "pH-Messung—Grundlagen, Methoden, Anwendungen, Gerate" [pH Measurement—Fundamentals, Methods, Applications, Devices], VCH Verlagsgesellschaft mbH, Weinheim, 1990, pp. 135-136. One of these approaches is formed by so-called enamel electrodes, which are typically constructed from a plurality of layers of different composition, the uppermost layer being formed from a pH-selective enamel layer.

The following is noted with respect to the term "enamel electrode" or "ion-selective or pH-selective enamel layer": According to the definitions/labeling standards, RAL registration RAL-RG 529 A2 from July 2007 by RAL Deutsches Institut für Gütesicherung und Kennzeichnung e. V. [RAL German Institute for Quality Assurance and Certification, registered association], a vitreous material that is produced by completely or partially melting substantially oxidic raw materials is referred to as an enamel. The inorganic preparation thus produced is applied with additives in one or more layers to workpieces made of metal or glass and fused at temperatures above 480° C. Base constituents of (ion-selective) enamel layers are, for example, one or more of the oxides silicon oxide, sodium oxide, potassium oxide, calcium oxide, magnesium oxide, and aluminum oxide. In addition to the RAL definitions, a definition attributable to Adolf Dietzel and Hans Kyri is also common, according to which enamel is a preferably glassy solidified composition, produced by melting or fritting, with inorganic, mainly oxidic composition, which is to be fused or has been fused to workpieces of metal or glass in one or more layers, partly with aggregates.

An ion-selective glass, e.g., pH glass, applied to a metallic base body using a method used in the RAL definition or by fusing the glass onto or to a substrate is therefore referred to hereinafter in the style of these definitions as an ion-selective enamel layer or, in the case of an enamel layer specifically selective for hydronium ions, as a pH enamel layer, and a corresponding electrode as an enamel electrode.

Enamel electrodes are characterized by high mechanical stability and can be hygienically designed by providing an enamel coating covering all parts of the probe coming into contact with the process. They can therefore be used especially advantageously in processes of the food industry and in chemical processes in which frequent sterilization, sanitization and purifications are to be carried out.

Two examples of enamel electrodes are given in the aforementioned textbook by H. Galster. In a first example, an insulation enamel layer is arranged on an iron substrate, a silver layer is arranged on the insulation enamel layer, and a pH-selective enamel layer is arranged on the silver layer. The silver layer serves as electrical terminal lead for measuring the potential of the enamel electrode in this example. In a second example, a Pt/Pd layer is applied to a ceramic substrate of forsterite, an adhesive oxide layer of CuO/FeO is applied thereover, and a pH-selective enamel layer of MacInnes glass is applied thereover. The individual layers are applied by means of thick film technology. The final ion-selective layer is applied according to the screen-printing process. A paste of ground MacInnes glass with a suitable binder is used for this purpose and is subsequently baked at 850° C.

The manufacture of the sensor elements mentioned from the prior art for potentiometric sensors is relatively complex and requires some or even a plurality of individual manufacturing steps.

SUMMARY

The object of the present disclosure is therefore to specify a sensor element for a potentiometric sensor which has a solid terminal lead and is easier to manufacture. It is a further object of the present disclosure to specify a simple manufacturing method for such a sensor element.

This object is achieved by the sensor element according to claim 1 and the method according to claim 7. Advantageous embodiments are listed in the dependent claims.

The sensor element according to the present disclosure for a potentiometric sensor comprises: a substrate formed from a metal alloy and an ion-selective enamel layer arranged on the substrate, wherein the metal alloy comprises at least one transition metal and wherein the ion-selective enamel layer contains a proportion of an oxide of the transition metal, and wherein an electrically conductive transition zone, for example an ion-conducting and/or electron-conducting transition zone, is arranged between the substrate and the enamel layer and contains the transition metal in different oxidation states.

The substrate, which is electrically conductively connected to the enamel layer via the transition zone, serves as a solid terminal lead of the sensor element and can be electrically conductively connected to a potentiometric sensor circuit which is configured to detect an electrode potential of the sensor element in contact with a measuring medium in comparison to a reference potential. In addition, the substrate can serve to mechanically stabilize the sensor element, especially, the enamel layer. The ion-selective enamel layer may be a pH-selective enamel layer.

The transition metal present in the transition zone in various oxidation states and the proportion of transition metal oxide in the ion-selective enamel layer contributes to the electrical conductivity of the ion-selective glass. The impedance of the sensor element according to the present disclosure can therefore be reduced compared to conventional ion-selective enamel sensor elements with comparable mechanical stability.

The sensor element according to the present disclosure can be manufactured by a method which comprises enameling the surface of the substrate with an ion-selective glass, which may, for example, already contain the transition metal oxide, as a central manufacturing step. As explained below, enameling can take place by fusing the glass or by applying a glass powder or an enamel preparation, such as an enamel slip, to the substrate surface and subsequent thermal treatment. Optionally, the surface of the substrate can be pretreated or conditioned beforehand, e.g. by passivation. Such a pretreatment or conditioning can contribute to the formation of the transition zone. At the temperatures occurring during enameling, in an interface region between the enamel layer and the substrate at least part of the transition zone is formed by diffusion and/or redox processes simultaneously with the production of the enamel layer. The transition zone may comprise an intermediate layer between the substrate and the ion-selective enamel layer, which contains the transition metal in various oxidation states. Due to diffusion processes in the interface region between the substrate and the ion-selective enamel layer, in particular during the application of the enamel layer by enameling the substrate, the transition zone may extend into the ion-selective enamel layer of the sensor element and/or into the substrate.

The transition metal which is contained both in oxidic form in the enamel layer and/or already in the enamel preparation used for preparing the enamel layer and in metallic form (oxidation state 0) in the metal alloy of the substrate can be, for example, manganese, cobalt, vanadium, or chromium. A plurality of different transition metals, e.g., manganese and cobalt, may advantageously also be present in the metal alloy and in the enamel preparation. If the metal alloy of the substrate contains one or more metals that is/are less noble than the transition metal contained in the glass of the enamel layer, corrosion processes occur at the interface between the resulting enamel layer and the substrate, which lead to dendrite formation and mechanical interlocking between the substrate and the enamel layer. The adhesion of the enamel layer to the substrate is thus improved.

The substrate can, for example, be a body formed from the metal alloy or be formed by at least one layer made of the metal alloy arranged on a base body, especially, a metallic or ceramic base body. The substrate forms the solid terminal lead of the sensor element. If the substrate is designed as a layer, it can be manufactured, for example, by placing a plate or a film made of the metal alloy onto the base body and by bonding the plate or the film firmly to the base body.

The metal alloy can, for example, be a steel, a stainless steel, or a noble-metal-based alloy, which can, for example, comprise cobalt and platinum. Such a noble-metal-based alloy can, for example, be a jewelry alloy, such as PtCo5 or Pt950Co50 as well as Pt670Co330. (Here, the numbers refer to the mass fraction of the respective alloy component).

The ion selective enamel layer can be formed from an ion-selective glass, especially, a pH membrane glass, which contains the oxide of the transition metal as an additive. Optionally, the ion selective glass can comprise further additives.

The ion selective enamel layer can be formed from several enamel layers. For example, it can comprise several layers of ion-selective glass. The ion selective enamel layer can optionally also have one or more electron-conducting and/or ion-conducting enamel base layers interposed between the substrate and the layer(s) of ion selective glass. The enamel forming the enamel base layer or layers may have a different composition from that of the ion selective glass layers disposed above it. One or more of such enamel base layers establish an electrically conductive contact between those layers of the enamel layer comprising the ion-selective glass and the substrate and can optionally additionally effect an improved adhesion of the layer or layers of the ion-selective glass to the substrate. The enamel base layer or layers may also contain an oxide of the transition metal in one or more different oxidation states.

The ion-selective glass of the enamel layer can be formed at least from the following constituents: silicon oxide ($SiO_2$), at least one alkali metal oxide ($R_2O$, where R=Li, Na, K, Rb, or Cs), at least one alkaline earth metal oxide (RO, where R=Mg, Ca, Sr, Ba) and the at least one oxide of the transition metal. Optionally, the components forming the ion-selective glass may comprise a plurality of alkali metal oxides and/or a plurality of alkaline earth metal oxides. Optionally, the ion-selective glass may contain further additives, such as boron oxide ($B_2O_3$).

If the sensor element is to be used for pH measurement, the ion-selective glass can advantageously contain sodium and/or lithium oxide. If the sensor element is to be used for sodium ion measurement, the ion-selective glass can contain sodium oxide.

In an advantageous embodiment, the sensor element comprises a preamplifier and/or an impedance transformer which can be connected to a potentiometric sensor circuit. One input of the preamplifier can be connected to the substrate serving as an electrically conductive potential terminal lead of the sensor element; a second input can be at a housing potential or at a virtual ground of the sensor circuit as reference potential. For example, if the sensor element is a component of a potentiometric sensor in which it serves as a measuring electrode and which furthermore has a reference electrode and a sensor circuit, which is configured to detect a voltage between the measuring electrode and the reference electrode and to generate a measurement signal as a function of this voltage, the preamplifier or impedance transformer can serve to increase the signal-to-noise ratio of the measurement signals. This is especially advantageous if the ion-selective layer has a high impedance.

The preamplifier can be arranged in a cavity within the already mentioned base body or in a housing at least partially surrounding the sensor element or in a sheath of an electrically insulating material surrounding a unit comprising at least the enamel layer and the substrate with the transition zone in between.

The present disclosure also relates to a potentiometric sensor comprising: at least one sensor element according to any one of the above-described embodiments, a reference electrode, and a sensor circuit electrically conductively connected to the sensor element and to the reference electrode, wherein the sensor circuit is configured to detect a potential difference between the sensor element and the reference electrode.

The method according to the present disclosure for manufacturing a sensor element for a potentiometric sensor, especially the sensor element according to any one of the above-described embodiments, comprises the following steps: applying an ion-selective, especially, pH-selective, enamel layer to a substrate, wherein the substrate is formed from a metal alloy comprising a transition metal, and wherein the enamel layer contains a proportion of an oxide of the transition metal, and wherein an electrically conductive transition zone, e.g., an electron-conducting and/or ion-conducting transition zone, forms between the substrate and the enamel layer during application of the enamel layer and contains the transition metal in several (i.e. at least two) different oxidation states.

The enameled sensor element obtained by this method is already fully functional and suitable for measuring an ion concentration or a pH value in a measuring liquid. In the sense of the definition given at the outset, the enameling step, i.e. the applying of the ion-selective enamel layer, can comprise the application of an enamel preparation with subsequent thermal treatment to form an enamel layer arranged on the substrate or the fusing of the glass forming the enamel layer onto or to the substrate. The method described here and below can thus be used in a very simple manner for manufacturing a sensor element for a potentiometric sensor. For example, the method can be used for manufacturing a sensor element like the one described above.

For example, the ion-selective enamel layer can be applied directly to the substrate. Optionally, the substrate can be pretreated or conditioned before the enamel layer is applied to it. An optional pretreatment can include a cleaning and/or conditioning of a surface of the substrate to which the ion-selective enamel layer is subsequently applied.

The transition zone forming during the application of the ion-selective enamel layer can include an ion-conducting and/or electron-conducting intermediate layer, said intermediate layer comprising the transition metal in different oxidation states.

In a first embodiment, applying the ion-selective enamel layer to the substrate may comprise the following steps: applying an enamel preparation of an ion-selective glass, especially, a pH glass, wherein the glass can contain a proportion of the oxide of the transition metal to the substrate and subsequently thermally treating the enamel preparation applied to the substrate to form the ion-selective enamel layer.

In a possible variant of the method, the enamel preparation can initially be free of the transition metal or free of oxide of the transition metal. In this method variant, the transition metal is only present in the alloy forming the substrate and, optionally, in an oxide layer on the substrate surface. During application and thermal treatment, oxide of the transition metal, in particular in several different oxidation states, can enter the resulting ion-selective enamel layer by redox and/or diffusion processes, thus forming a transition zone between the substrate and the enamel layer, in which the transition metal is present in different oxidation states. The transition zone can (depending on the conditions selected during the enameling process) extend into the ion-selective enamel layer, so that the ion-selective enamel layer of the finished sensor element contains a proportion of at least one oxide of the transition metal. An ion-selective enamel layer of a sensor element produced according to this method variant has a concentration gradient of the at least one oxide of the transition metal in a direction perpendicular to the interface between substrate and ion-selective enamel layer. Depending on the choice of chemical and thermal conditions during enameling, a region of the ion-selective enamel layer which is remote from the substrate and close to the surface intended for contacting a measuring medium can be substantially free of the oxide of the transition metal.

In a possible other variant of the process, the enamel preparation may already contain a proportion of at least one oxide of the transition metal. Irrespective of any additional redox and diffusion processes which may occur during application of the enamel preparation and thermal treatment and which may change the chemical composition of the resulting transition zone, the ion-selective enamel layer of the sensor element obtained by this process variant contains a proportion of at least one oxide of the transition metal.

The thermal treatment of the enamel preparation applied to the substrate can be carried out at a temperature between 700° C. and 1050° C. At this temperature, the above-described transition zone forms within a few minutes, e.g., in <10 min., preferably <5 min., particularly preferably <4 min. The transition zone can take the form of an intermediate layer in an interface area between the ion-selective enamel layer and the substrate.

The enamel preparation can be produced as a powder comprising at least glass particles of the ion-selective glass, especially, the pH glass, or as a suspension or a paste comprising at least glass particles of the ion-selective glass, especially, the pH glass. As already mentioned, the ion-selective glass can be formed of at least the following components: silicon oxide ($SiO_2$), at least one alkali metal oxide ($R_2O$ with R=Li, Na, K, Rb or Cs), at least one alkaline earth metal oxide (RO with R=Mg, Ca, Sr, Ba) and the at least one oxide of the transition metal. The glass can optionally contain further additives.

In a second embodiment, applying the ion-selective enamel layer to the substrate may comprise placing a glass body of an ion-selective glass containing a proportion of the oxide of the transition metal onto the substrate and fusing the glass body to the substrate to form the ion-selective enamel layer. The fusing can take place, for example, by means of a thermal treatment in a furnace or by heating with a gas flame or with a laser. In an advantageous method embodiment, the temperatures occurring in the process are at least temporarily in the range between 700° C. and 1050° C.

In a further embodiment, applying the ion-selective enamel layer to the substrate may comprise applying a melt of an ion-selective glass, especially, a melt containing the proportion of the oxide of the transition metal to the substrate and allowing the melt to solidify, where appropriate by a rapid, defined cooling process, to form the ion-selective enamel layer. The defined cooling can be achieved, for example, by actively controlling or regulating the temperature of the enamel layer. In all cases, the ion-selective glass may be a pH-glass.

The application of the ion-selective enamel layer can include the application of several individual enamel layers. The individual enamel layers can be formed from the ion-selective glass. It is also possible that at least one electron and/or ion conducting enamel base layer is applied directly to the substrate and at least one layer of the ion selective glass is applied to the at least one enamel base layer. An enamel preparation used to produce the electrically conductive enamel base layer can include glass particles which differ in their chemical composition from the glass particles of the ion-selective glass contained in the enamel preparation used to produce the layer from the ion-selective glass. Both the at least one enamel base layer and the at least one enamel layer formed from ion-selective glass may contain an oxide of the transition metal in one or more different oxidation states.

In all the method embodiments described here, the ion-selective enamel layer can be applied in the classical way in air. Alternatively, the enamel layer can be applied in all the process embodiments described here, either wholly or in part under an oxygen-free or low-oxygen atmosphere or under inert gas. By controlling the oxygen content present in the atmosphere, the respective proportions of the various oxidation stages of the transition metal present in the transition zone and/or enamel layer can be influenced and/or specifically adjusted.

The ratio of the oxidation states of the transition metal present in the transition zone can further be influenced by the oxygen chemically or physically bound in the glass of the enamel layer. For this purpose, for example, a composition of the above-mentioned at least one enamel base layer can be selected in such a way that redox reactions between the constituents of the enamel base layer and the layers arranged above it, which comprise the ion-selective glass, and diffusion or convection processes influence the setting of a desired ratio of the proportions of the oxidation states of the transition metal present in the transition zone and/or the enamel layer.

The ion-selective glass used in all of the method embodiments presented herein may be a pH glass or a sodium-potassium-, or lithium-selective glass, including, in particular, a proportion of one or more transition metal oxides of transition metals also contained in the metal alloy of the substrate. If the sensor element is intended for potentiometric pH measurement, a lithium- and/or sodium-containing pH glass can be used. A sodium-free, lithium containing glass exhibits a reduced cross-sensitivity to sodium ions in the measuring medium, while sodium-containing glasses are usually easier to apply to the substrate by enameling. The glass may be composed as already stated above in connection with the description of various advantageous embodiments of the sensor element.

The ion-selective enamel layer can be formed, for example, by one or more layers applied successively and one above the other to the substrate in order to ensure that it completely covers the substrate as a closed layer. As mentioned above, one or more base layers of the multilayer enamel layer close to the substrate can be formed from an electron and/or ion conducting enamel whose composition differs from an ion selective glass forming the layers arranged above the one or more base layers. The base layer or layers provide an electrically conductive contact between the substrate and the cover layers of the ion-selective glass. The base layer or layers can also provide improved adhesion of the ion-selective enamel layer to the substrate.

In one possible embodiment, the substrate can be a body formed from the metal alloy. It can be a solid or thin-walled body, e.g., in the form of a rod or a plate or a chip.

In another possible embodiment, the substrate can be formed by at least one layer arranged on a base body, which can be a metallic or ceramic base body, wherein the at least one layer consists of the metal alloy.

Before the enamel preparation is applied, the substrate can be conditioned, especially passivated. The conditioning can include a thermal pretreatment or a plasma pretreatment. The conditioning can create an oxide layer on the substrate surface, which contains the transition metal in different oxidation states. The proportions of the individual oxidation states of the transition metal in the oxide layer can be adjusted according to a specific target using the selected process. The oxide layer produced in this way can have a thickness between 0.1 and 5 μm, preferably less than 2 μm. The oxide layer can serve for influencing the formation of the transition zone during the subsequent enameling of the substrate. For example, it can promote the formation of the transition zone. As the oxide layer can have a defined composition and quality which is dependent on the reaction conditions prevailing during the conditioning of the substrate, it can also be used to ensure a defined wetting of the substrate surface by the enamel preparation or the glass to be melted during the enameling process. This results in a homogeneous and defect-free enamel layer. This is accompanied by an improved stability against mechanical loads and an improved sensory behavior of the sensor element.

The conditioning of the substrate can include thermal pretreatment, for example in an oven, by means of a flame or by means of a laser. Alternatively, the conditioning of the substrate can include a plasma treatment of the surface, for example in an oxygen plasma. Conditioning can also be performed by depositing an oxide layer by means of a gas phase coating process, e.g., by (reactive) sputtering, CVD (chemical vapor deposition), ALD (atomic layer deposition).

The conditioning can be carried out at least partially in an oxygen-free or low-oxygen inert gas atmosphere.

The method may furthermore comprise the following step: sheathing a unit comprising at least the enamel layer and the substrate with an electrically insulating material, e.g., a glass, such that a sheath formed in this way leaves open, in a region of the sensor element intended for contact with a measuring medium, only a surface of the enamel layer facing away from the substrate. An electrical conductor contacting the substrate may be passed through the sheath in order to contact the substrate from outside the sheath.

The method step of sheathing the unit comprising the enamel layer and the substrate may comprise: applying a powder comprising glass particles or a suspension or paste comprising glass particles to the unit; and thermally treating the applied powder or suspension or paste to form a glass layer forming the sheath.

Alternatively, sheathing may also comprise applying a glass melt to the unit and cooling the glass melt or insert-molding the unit with a plastic or a ceramic.

The present disclosure also comprises a sensor element manufactured according to the method described above, for example in one of its variants described here. The sensor element may have the structural and functional properties of the sensor element described above. A sensor element manufactured according to the method described above can be used as a measuring electrode in a potentiometric sensor for measuring an ion concentration or a pH value in a measuring liquid. The potentiometric sensor can also have a potentially stable reference electrode and a measuring circuit, whereby the measuring circuit generates a measuring signal dependent on a voltage between the reference electrode and the measuring electrode.

BRIEF DESCRIPTION OF THE DRAWINGS

In the following, the present disclosure is explained in further detail on the basis of the exemplary embodiments shown in the figures, in which.

DETAILED DESCRIPTION

Figure 1:
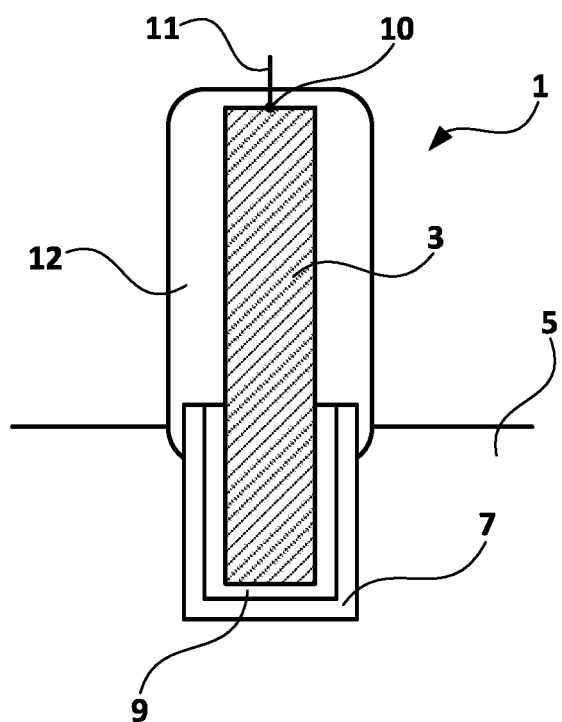
FIG. 1 shows a schematic longitudinal sectional view of a sensor element for a potentiometric sensor according to a first exemplary embodiment.

FIG. 1 schematically shows a sensor element 1 for a potentiometric sensor according to a first exemplary embodiment in a longitudinal section. The sensor element 1 has a substrate 3 in the form of a rod-shaped body made of a metal alloy and an ion-selective enamel layer 7, which serves as a sensor layer and is arranged directly on the substrate 3 in a front section of the sensor element 1 intended for contact with a liquid, especially, water-containing, measuring medium 5. The metal alloy of which the substrate 3 consists is, for example, a steel and contains at least one transition metal which, in addition to the oxidation state 0, can assume at least two further, mutually different stable oxidation states. Examples of such transition metals are cobalt, manganese, chromium, or vanadium.

In the present example, the enamel layer 7 is based on a sodium-sensitive or pH-sensitive glass, e.g., McInnes glass, Corning 015 glass, or one of the glasses known from U.S. Pat. No. 3,458,422, which contains as an additive a proportion of at least one oxide of the transition metal. The glasses mentioned in U.S. Pat. No. 3,458,422 contain a proportion of $Li_2O$ and are free of $Na_2O$ so that the cross-sensitivity of pH measurements with a sensor layer of one of these glasses is reduced. As an alternative, however, pH-glass containing sodium or pH-glass containing sodium and being essentially free of lithium can be used. The enamel layer 7 can be applied to the substrate 3 in one or more layers arranged one above the other. The glass forming the enamel layer 7 may contain a single transition metal oxide or a plurality of oxides of the transition metal in different oxidation states or a plurality of oxides of different transition metals, each of which may assume a plurality of mutually different stable oxidation states aside from the oxidation state 0 and which are also contained in the substrate 3.

An electron-conducting and/or ion-conducting transition zone 9 is formed between the substrate 3 and the enamel layer 7. For example, the transition zone 9 can be formed as an intermediate layer. The thickness of the transition zone 9 and the enamel layer 7 are shown greatly exaggerated in FIG. 1. The transition zone 9 forms at least partly during application of the enamel layer 7 by enameling and contains the transition metal contained in the substrate and the enamel in several different oxidation states. Redox processes and diffusion processes occurring at the interface between the substrate 3 and the glass or glass slurry or enamel preparation applied to the substrate 3 for enameling, influence the thickness and chemical composition of the transition zone 9. In addition, roughening of the substrate surface due to corrosion and/or dendrite formation can occur in said transition zone, which can improve the adhesion of the enamel layer 7 on the substrate. The transition zone remains stable even after enameling and is ion-conducting and/or electron-conducting.

The substrate 3 and the transition zone 9 serve as a solid state contact forming a terminal lead (also referred to as a solid terminal lead) for measuring an electrode potential which is formed at the ion-selective enamel layer 7 in contact with the measuring medium 5. On the rear side, i.e., on its side facing away from the measuring medium 5, the substrate 3 includes a contact point 10 at which an electrical conductor 11, e.g. a metallic wire or a conductor track, is electrically connected to the substrate 3. This conductor 11 can be connected to a sensor circuit of a potentiometric sensor.

The sensor element 1 moreover includes a sheath 12, which is formed by an insulation enamel layer in the present example. Alternatively, the sheath may be formed from a polymer instead of an enamel layer of glass. It surrounds the body forming the substrate 3 and an edge region of the layers 7 and 9 tightly so that no liquid, especially, not the measuring medium 5, reaches the substrate 3.

The sheath 12 may be produced using methods which are known in connection with enameling metal substrates. Suitable materials for the sheath 12 and suitable methods for applying the sheath 12 to the unit, formed from the substrate 3 and the ion-selective enamel layer 7 with transition zone 9 arranged between them can, for example, be found in EP 1 231 189 A1. The sheath 12 can be produced by applying particles of a glass composition to the substrate 3 and the enamel layer 7 and subsequent thermal treatment.

Advantageously, the coefficients of thermal expansion of the glass forming the enamel layer 7, of the sheath 12, and of the substrate 3 are matched to one another, i.e., the respective materials are ideally selected such that their coefficients of thermal expansion differ by less than 10%, or even by less than 5%. Coefficients of thermal expansion of known pH glasses are around $10^{-6}$ $K^{-1}$; for example, the coefficient of expansion of Corning 015 glass is $11 \cdot 10^6$ $K^{-1}$ or that of the glasses known from U.S. Pat. No. 3,458,422 is between 9.3 and $10.4 \cdot 10^{-6} K^{-1}$. It is advantageous if the coefficient of thermal expansion of the substrate 3 is higher than that of the ion-selective enamel layer 7.

Figure 2:
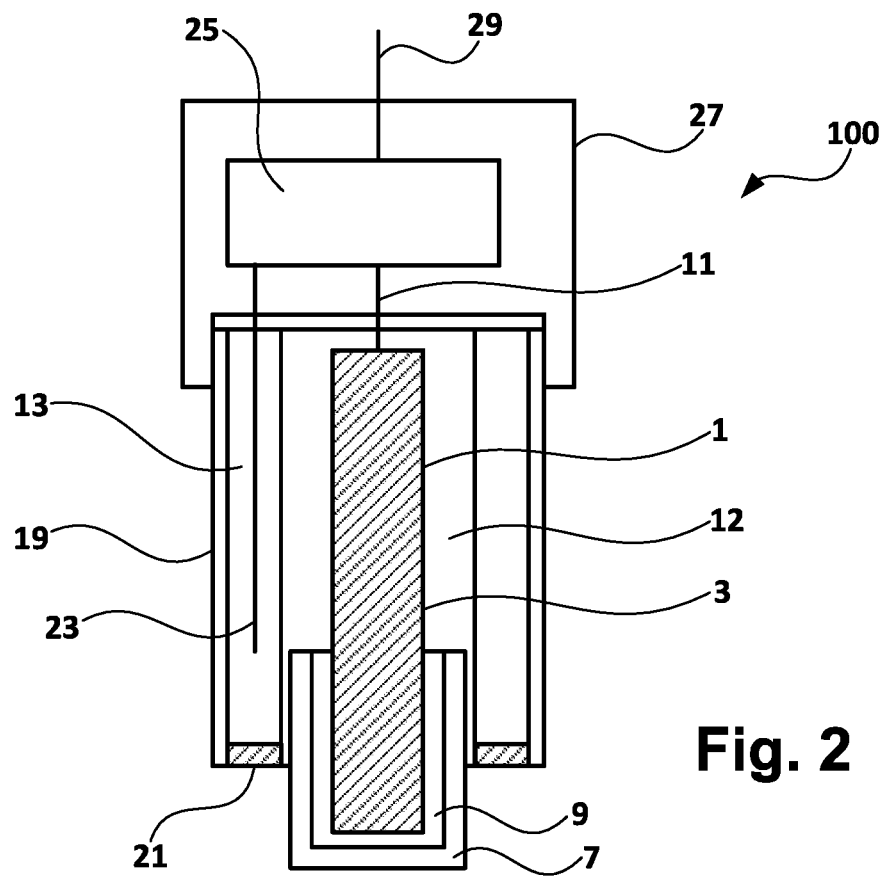
FIG. 2 shows a schematic longitudinal sectional view of a potentiometric sensor with the sensor element according to the first exemplary embodiment.

FIG. 2 shows a schematic longitudinal sectional view of a potentiometric sensor 100 for measuring an activity or concentration of an analyte ion or a measured variable dependent thereon, e.g., a pH value, with a sensor element 1 as measuring electrode and a reference electrode 13.

The sensor element 1 substantially structurally corresponds to the sensor element 1 shown in FIG. 1. It includes as a sensor layer an ion-selective enamel layer 7 which is applied to a cylindrical body which is made of a metal alloy and serves as substrate 3, wherein an electrically conductive transition zone 9 is formed between the enamel layer 7 and the substrate. The transition zone 9 can be formed as an intermediate layer between the substrate 3 and the ion selective enamel layer 7. As in the sensor element 1 shown in FIG. 1, the metal alloy contains at least one transition metal which is also contained in the enamel layer 7 in oxidized form and which is present in the transition zone 9 in a plurality of different oxidation states. The sensor element 1 furthermore comprises a sheath 12 of an insulating enamel or of a polymer, which sheath surrounds the substrate 3, only leaves open a surface of the enamel layer 7 intended for contact with the measuring medium, and insulates the substrate 3 and an edge region of the enamel layer 7 or of the transition zone 9 from the liquid medium.

The reference electrode 13 may be designed as a conventional electrode of the second type, e.g., as a silver/silver chloride electrode. In the example shown here, it comprises a tubular housing 19 which surrounds a section of the sheath 12 of the substrate 3 and which is closed at its front end facing the measuring medium by an annular diaphragm 21. The diaphragm 21 may be formed, for example, from a plastic, e.g., polytetrafluoroethylene (PTFE), or from a porous ceramic, e.g., a $ZrO_2$ ceramic. The annular chamber formed between the sheath 12 and the housing 19 contains a reference electrolyte, e.g., a KCl solution, in which a reference element 23, e.g., a silver electrode coated with silver chloride, is immersed. Instead of a diaphragm 21, the reference electrode 13 may also have another junction which establishes an ion-conducting and/or an electrolytic contact between the reference electrolyte and the measuring medium. The annular chamber containing the reference electrolyte is closed on its rear side, e.g., by casting or adhesive bonding.

The substrate 3 is connected via a first electrical connector 11 to a sensor circuit 25 and thus forms the measuring electrode of the potentiometric sensor 100. The sensor circuit 25 is accommodated in an electronics housing 27 connected to the reference and measuring electrode of the sensor 100. The reference element 23 is passed out of the annular chamber through the casting or bonding and is also connected to the sensor circuit 25. The sensor circuit 25 is configured to detect a voltage arising in contact of the diaphragm 21 and of the ion-selective enamel layer 7 with the measuring medium between the measuring electrode 1 and the reference electrode 13. This voltage is a function of the activity of the analyte ion present on the ion-selective enamel layer 7. The sensor circuit 25 may be configured to generate a measurement signal representing the detected voltage and to output it, e.g., to a measuring transducer which is connected to the sensor circuit 25 and processes the measurement signal, and embodied to determine therefrom, using a predetermined calibration function, a measured value of the ion concentration of the analyte ion or, if the potentiometric sensor 100 is designed as a pH sensor, of the pH value. Alternatively, the sensor circuit 25 may also be configured to determine the measured value and to output it via an interface 29 to a measuring transducer or another operating or display device.

Figure 3:
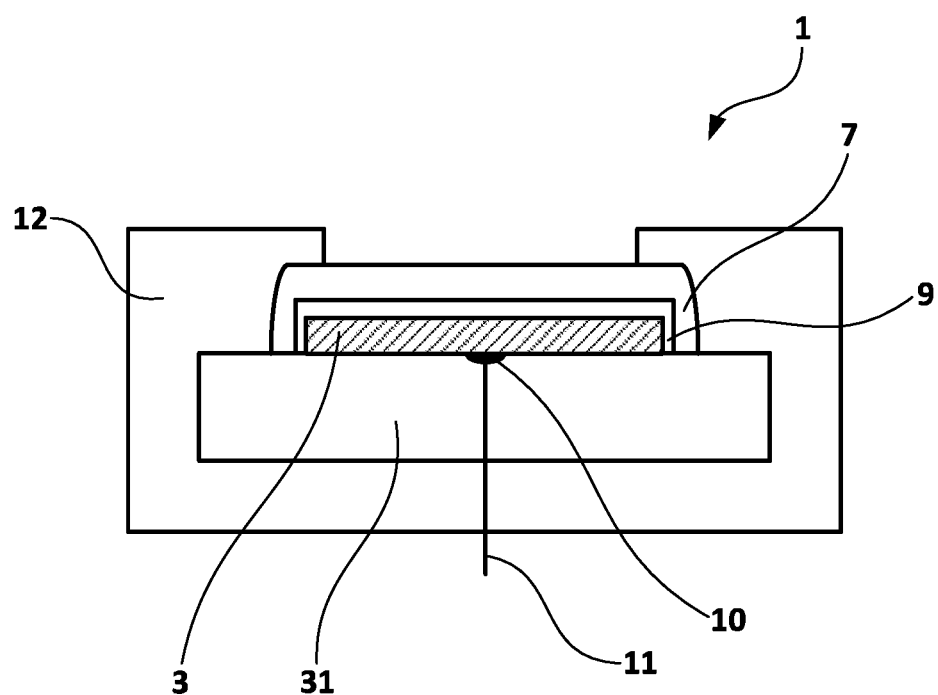
FIG. 3 shows a schematic longitudinal sectional view of a sensor element for a potentiometric sensor according to a second exemplary embodiment.

FIG. 3 schematically shows another exemplary embodiment of a sensor element 1 for a potentiometric sensor. This sensor element 1 has a base body 31 which is made of a ceramic or a glass ceramic and on which a substrate 3 formed from a metal alloy is arranged in the form of a layer. The layer may be formed by a plate or sheet of metal alloy bonded, adhesively bonded, or otherwise attached to the base body or may be applied by means of a coating or deposition method. The ceramic of the base body may, for example, be a zirconium oxide ceramic or an aluminum oxide ceramic.

An ion-selective enamel layer 7 serving as a sensor layer is applied to the substrate 3. A transition zone 9 is arranged between the enamel layer 7 and the substrate 3. The transition zone 9 can, for example, be an intermediate layer or it can include an intermediate layer. As in the examples described above, the metal alloy of the substrate 3 contains at least one transition metal which is also contained in the ion-selective enamel layer 7 in oxidized form and which is present in different oxidation states in the transition zone 9 formed during enameling.

The transition zone 9 is electron-conducting and/or ion-conducting and forms, together with the substrate 3, the solid terminal lead of the sensor element 1. At a contact point 10, the substrate is contacted on its rear side by an electrical conductor 11 which is passed through the base body 31 and which can connect the sensor element 1 to a sensor circuit of a potentiometric sensor. The unit formed from the base body 31, the substrate 3, the transition zone 9, and the ion-selective enamel layer is embedded in a glass sheath 12, which leaves open only a surface region of the ion-selective enamel layer 7, and which insulates the interfaces between the substrate 3 and the base body 31 and between the substrate 3 and the overlying layers from a measuring medium.

Optionally, the sensor element can comprise a preamplifier and/or an impedance transformer (not shown here) which serves to increase the signal-to-noise ratio of the measurement signal of the sensor element or of a potentiometric sensor with the sensor element. The integration of a preamplifier in the signal path close to the ion-selective enamel layer is especially advantageous if the ion-selective enamel layer has a high impedance.

A potentiometric sensor comprising the sensor element 1 shown here as a measuring electrode may have a reference electrode which is also completely formed by a layer stack and whose potential terminal lead is designed as a solid terminal lead. Both electrodes may be arranged on a common base body, e.g., a circuit board or a non-conductive ceramic, and be connected to a sensor circuit via electrical lines, e.g., conductor paths extending on the base body. In this way, a very compact potentiometric sensor may be realized.

For manufacturing the sensor elements as shown in FIGS. 1 to 3, the enameling of the substrate 3 can be performed in the following way:

In a first method variant, a glass body, e.g., a glass plate, of the ion-selective glass can be placed and fused onto the substrate 3. In this case, temperatures in the range between 800 and 850° C. should be achieved in order to ensure that the electrically conductive transition zone 9 containing mixed-valent oxides of the transition metal forms together with the ion-selective enamel layer 7. In the case of lithium-free, sodium-containing pH-selective glasses or sodium-selective glasses, this method has proven to be suitable, but it can also be used for lithium-containing glasses, e.g., lithium-containing pH-selective glasses.

In a second method variant, an enamel preparation, e.g., a powder formed from glass particles of the ion-selective glass or a suspension or a paste containing glass particles of the ion-selective glass, can be applied to the surface of the substrate 3 and heated over a short period of time to a temperature between 800 and 850° C. As a result of the thermal treatment, the enamel layer 7 on the one hand and, at the same time, at least part of the transition zone 9 on the other hand form. This method has proved to be highly suitable for the application of a sodium and/or lithium-containing ion-selective enamel layer 7.

In both process variants, the enameling can be carried out in air or under an oxygen-free or low-oxygen inert gas atmosphere in order to influence the composition of the transition zone 9, in particular the proportion of the individual oxides of the transition metal in different oxidation states present in the transition zone 9.

In both process variants, the ion-selective glass of the enamel preparation or the glass body can initially be free of the transition metal. When applying the enamel preparation or the glass body to the substrate, oxides of the transition metal can form in different oxidation states in the interface region between the substrate and enamel layer at the temperatures prevailing during application, possibly with the participation of oxygen from the glass and/or from the atmosphere in redox and diffusion processes. The transition metal oxides can diffuse from the interface into the ion-selective enamel layer. In this way, a transition zone 9 is formed between the substrate and the ion-selective enamel layer, which extends into the latter and contains the transition metal in different oxidation states. Due to diffusion of the transition metal oxides into the ion selective enamel layer 7, the solidified enamel layer contains a proportion of at least one oxide of the transition metal. The transition zone 9 remains stable after cooling and solidification of the enamel layer and forms an electron and/or ion conductive intermediate layer. Depending on the conditions prevailing during application and solidification of the ion-selective layer 7, an outer region of the ion-selective layer intended for contact with the measuring liquid may remain free of the transition metal.

In an alternative embodiment, the ion-selective glass of the enamel preparation or the glass body used in the above-mentioned process variants may already contain the transition metal in the form of one or more oxides in a single or in several different oxidation states. During application of the enamel layer, the transition zone 9 is also formed in this variant by redox and diffusion processes occurring in the interface region, in such a way, that the transition metal is present in the transition zone 9 in several different oxidation states, thus forming an electron and/or ion-conductive intermediate layer.

In all these process variants, the substrate 3 can optionally be passivated before enameling in order to create an oxide layer on the substrate surface which contains the transition metal in various oxidation states. After the application of the ion-selective enamel layer 7, this oxide layer can remain at least partially intact as a component of the transition zone 9 between the substrate and the ion-selective enamel layer 7, but it can also dissolve completely in the transition zone 9 during the application of the enamel layer 7.

The oxide layer can be created by a thermal treatment of the surface of the substrate 3, e.g., in a flame, by means of a laser or in a furnace, in air or in a low-oxygen or oxygen-free inert gas atmosphere. Similarly, the oxide layer can be produced by treatment in an oxygen plasma or by coating processes such as sputtering or vapor phase deposition. By adjusting the process conditions and the amount of oxygen provided in the surrounding atmosphere, the ratio in which the different oxidation states of the transition metal are present in the oxide layer can be influenced or controlled. This also allows the ratio in which the various oxidation states of the transition metal are present in transition zone 9 after enameling to be influenced according towards a specific target.

The oxide layer can have different functions, also depending on the chemical composition of the substrate 3 and the ion-selective enamel layer 7. For example, it can be used to improve the adhesion of the ion-selective enamel layer 7 to the substrate 3. To this end, redox and corrosion processes occurring at the interface during the application of the enamel layer 7 and involving the oxide layer can, for example, lead to an improved adhesion between the enamel layer and the substrate 3.

The oxide layer can also serve to ensure a defined wetting of the substrate 3 by the enamel preparation during enameling or by the ion-selective glass during melting, since its chemical composition and thus its structure and surface properties can be specifically adjusted by the conditions prevailing during passivation. Uniform wetting of the substrate surface during application of the enamel layer 7 results in a very homogeneous, low-defect enamel layer 7, which in turn has a positive effect on the sensor properties of the sensor element 1 produced in this way.

The invention claimed is:

1. A sensor element for a potentiometric sensor, the sensor element comprising:
   a substrate formed from a metal alloy, wherein the metal alloy comprises at least one transition metal, and wherein the substrate comprises at least one layer of the metal alloy disposed on a metallic or ceramic base body, wherein the at least one layer consists essentially of the metal alloy;
   an ion-selective enamel layer disposed on the substrate, wherein the enamel layer includes a proportion of at least one oxide of the transition metal; and
   an electrically conductive transition zone disposed between the substrate and the enamel layer, the transition zone comprising the transition metal in a plurality of different oxidation states.

2. The sensor element of claim 1, wherein the metal alloy is a steel, a stainless steel, or a noble-metal-based alloy.

3. The sensor element of claim 1, wherein the enamel layer comprises an ion-selective glass, which contains an oxide of the transition metal as an additive.

4. A potentiometric sensor, comprising:
   at least one sensor element according to claim 1;
   a reference electrode; and
   a sensor circuit electrically conductively connected to the at least one sensor element and the reference electrode, wherein the sensor circuit is configured to detect a potential difference between the sensor element and the reference electrode.

5. A method for manufacturing a sensor element for a potentiometric sensor, the method comprising:
   applying an ion-selective enamel layer to a substrate, wherein the substrate is formed from a metal alloy comprising a transition metal, and wherein the enamel layer includes a proportion of an oxide of the transition metal,
   wherein the enamel layer is applied to the substrate such that an electrically conductive transition zone forms between the substrate and the enamel layer during application of the enamel layer and includes the transition metal in different oxidation states.

6. The method of claim 5, wherein applying the enamel layer to the substrate comprises:
   applying an enamel preparation of an ion-selective glass to the substrate; and
   subsequently, thermally treating the enamel preparation applied to the substrate so as to form the enamel layer.

7. The method of claim 6, wherein the enamel preparation of the ion-selective glass includes a proportion of the oxide of the transition metal.

8. The method of claim 6, wherein the thermal treatment of the enamel preparation applied to the substrate is performed at a temperature between 700° C. and 1050° C.

9. The method of claim 6, wherein the enamel preparation is produced as a powder comprising at least glass particles of the ion-selective glass or as a suspension or paste comprising at least glass particles of the ion-selective glass.

10. The method of claim 5, wherein applying the enamel layer to the substrate comprises:
    placing a glass body of an ion-selective glass containing a proportion of the oxide of the transition metal onto the substrate; and
    fusing the glass body to the substrate to form the enamel layer.

11. The method of claim 5, wherein applying the enamel layer to the substrate comprises:
    applying a melt of an ion-selective glass to the substrate; and
    allowing the melt to solidify by a cooling process to form the enamel layer.

12. The method of claim 5, wherein the substrate is a solid or thin-walled body formed from the metal alloy in a form of a rod, plate or chip.

13. The method of claim 5, wherein the substrate is formed by at least one layer arranged on a base body, wherein the at least one layer consists essentially of the metal alloy.

14. The method of claim 5, wherein the substrate is conditioned before the enamel layer is applied.

15. The method of claim 14, wherein the substrate is conditioned such that an oxide layer containing at least the transition metal in different oxidation states is produced on a surface of the substrate.

16. The method of claim 5, further comprising:
    sheathing a unit comprising at least the enamel layer and the substrate with an electrically insulating material such that a sheath so formed includes an opening which leaves exposed a portion of a surface of the enamel layer facing away from the substrate in a region of the sensor element intended for contact with a measuring medium.

17. The method of claim 16, wherein an electrical conductor that contacts the substrate is extended through the sheath to contact the substrate from outside the sheath.

18. The method of claim 16, wherein sheathing the unit comprising at least the enamel layer and the substrate comprises:
    applying a powder comprising glass particles or a suspension comprising glass particles to the unit; and
    thermally treating the applied powder or suspension to form a glass layer forming the sheath.

* * * * *